F. B. WILLIAMS.
Shaft Centerer.
No. 39,608.
Patented Aug. 18, 1863.
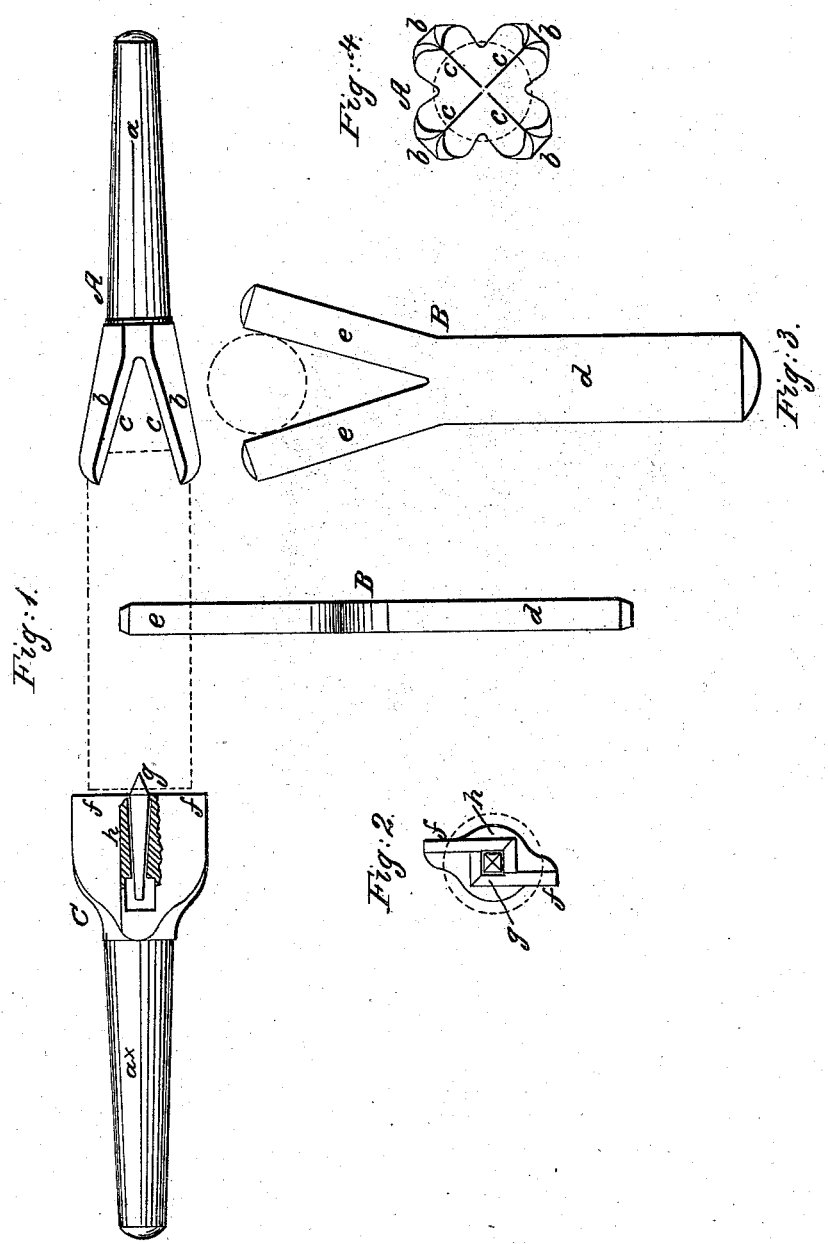

UNITED STATES PATENT OFFICE.

F. B. WILLIAMS, OF STERLING, ILLINOIS.

IMPROVED DEVICE FOR CENTERING SHAFTING.

Specification forming part of Letters Patent No. 39,608, dated August 18, 1863.

*To all whom it may concern:*

Be it known that I, F. B. WILLIAMS, of Sterling, in the county of Whiteside and State of Illinois, have invented a new and Improved Device for Centering Shafting to be Turned in Lathes; and I do hereby declare that the following is a full, clear, and exact description of the same, reference being had to the accompanying drawings, making a part of this specification, in which—

Figure 1 is a view of my invention, shown in the position in which they are placed when in use; Fig. 2, an end view of the drill and cutters; Fig. 3, a side view of the support; Fig. 4, an end view of the driver and centering device.

Similar letters of reference indicate corresponding parts in the several figures.

This invention consists in the employment or use of a pronged centering device, a rest or support, and a drill and cutter applied to an ordinary lathe in such a manner as to admit of shafting being readily centered and the ends turned or cut perfectly square or at right angles to their peripheries.

To enable those skilled in the art to fully understand and construct my invention, I will proceed to describe it.

A represents what may be termed the "driving and centering portion" of the device, which is formed of a slightly-conical shank, $a$, having four prongs, $b$, which project out from the shank in flaring form and have angular inner edges, $c$. The prongs $b$ all project from the shank $a$ at the same angle.

B represents what may be termed the "support" of the device, which is simply a straight bar, $d$, divaricated or forked at one end, the two prongs $e\ e$ projecting from the bar $d$, so as to form equal angles, as shown clearly in Fig. 3.

C represents the drill and cutter pertaining to the device. The cutter is formed of two blades, $f f$, which are at the end of a shank $a^\times$, and arranged similar to an ordinary bit, and the drill $g$ is inserted in a socket, $h$, at the junction of the two blades $f f$. (See Figs. 1 and 2.)

The above-described parts are all constructed of metal. The drill and cutters should of course be of steel, and it would be preferable to have the other parts constructed of the same material.

The device is used as follows: The driver A is inserted in the mandrel of the head-block of a lathe. The support B is placed in the tool-jack, and the shank $a^\times$ of the drill and cutters is placed in the mandrel of the tail-block. The shaft to be centered is placed one end in the driver A, the prongs $b$ of which center the shaft, while the support B holds the shaft in line with the drill $g$, so that as the drill and cutters are fed or moved up to the shaft the drill $g$ will enter the same, while the cutters or blades $f f$ will cut or turn off the end of the shaft at right angles with the periphery of the same. The angles $c$ of the prongs $b$ cause the driver A to catch the shaft so that it will be rotated, the oblique portion of the prongs causing the end of the shaft to bind in it while it is being centered.

Having thus described my invention, what I claim as new, and desire to secure by Letters Patent, is—

The combination of the driving and centering device A, support B, and the drill and cutters or blades $g f f$, constructed and applied to a lathe for the purpose of centering shafts, as herein set forth.

F. B. WILLIAMS.

Witnesses:
J. S. STAVER,
H. S. POWELL.